(12) United States Patent
Suzuki et al.

(10) Patent No.: US 11,073,424 B2
(45) Date of Patent: Jul. 27, 2021

(54) FOURIER SPECTROSCOPIC ANALYZER

(71) Applicant: Yokogawa Electric Corporation, Tokyo (JP)

(72) Inventors: Yasuyuki Suzuki, Tokyo (JP); Yukihiro Nakamura, Tokyo (JP); Masashi Nishi, Tokyo (JP); Tetsushi Namatame, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/648,104

(22) PCT Filed: Sep. 10, 2018

(86) PCT No.: PCT/JP2018/033394
§ 371 (c)(1),
(2) Date: Mar. 17, 2020

(87) PCT Pub. No.: WO2019/059018
PCT Pub. Date: Mar. 28, 2019

(65) Prior Publication Data
US 2020/0278256 A1  Sep. 3, 2020

(30) Foreign Application Priority Data
Sep. 19, 2017 (JP) .............................. JP2017-178656

(51) Int. Cl.
*G01B 9/02* (2006.01)
*G01J 3/453* (2006.01)

(52) U.S. Cl.
CPC ..... *G01J 3/4535* (2013.01); *G01J 2003/4538* (2013.01)

(58) Field of Classification Search
CPC .......... G01J 3/45; G01J 3/4535; G01J 3/0297; G01J 2003/4538; G01J 9/0246;
(Continued)

(56) References Cited

U.S. PATENT DOCUMENTS 7,903,252 B2 * 3/2011 Larsen .................. G01J 3/0262
356/451
10,697,830 B1 * 6/2020 Kangas .................... G01J 3/51
(Continued)

FOREIGN PATENT DOCUMENTS

| JP | H10-048046 A | 2/1998 |
| JP | 2014215177 A | 11/2014 |
| JP | 2017026345 A | 2/2017 |

OTHER PUBLICATIONS

T. Nanko et al., "Near Infrared Spectral Analyzer InfraSpec NR800." Yokogawa Technical Report, vol. 45, No. 3, 2001, pp. 179-182 (4 pages).

*Primary Examiner* — Tarifur R Chowdhury
*Assistant Examiner* — Jonathon Cook
(74) *Attorney, Agent, or Firm* — Osha Bergman Watanabe & Burton LLP

(57) ABSTRACT

A Fourier spectroscopic analyzer includes: a light receiver that receives a first wavelength component of a first wavelength band and a second wavelength component of a second wavelength band different from the first wavelength band, emits an interferogram to a sample, and outputs a first light reception signal acquired by receiving the first wavelength component and a second light reception signal acquired by receiving the second wavelength component; and a signal processing device that eliminates noise of the first wavelength component and acquires the spectrum by Fourier transform processing using the first light reception signal and the second light reception signal. The first wavelength band is a wavelength band of which a spectrum is acquired among wavelength components included in light that has passed through the sample. The interferogram is interference light and the sample is an analysis target.

8 Claims, 9 Drawing Sheets

(58) Field of Classification Search
CPC ........ G01N 2021/3595; G01B 9/02062; G01B 9/02076; G01B 9/02077; G01B 9/02083; G01B 9/02084
See application file for complete search history.

(56) References Cited

U.S. PATENT DOCUMENTS

| | | | |
|---|---|---|---|
| 2011/0079719 A1* | 4/2011 | Xu | G01J 3/4535 250/339.08 |
| 2014/0152993 A1* | 6/2014 | Hirao | G01J 3/4532 356/451 |
| 2014/0319351 A1 | 10/2014 | Yamada et al. | |
| 2017/0234675 A1 | 8/2017 | Iddan et al. | |

* cited by examiner

FOURIER SPECTROSCOPIC ANALYZER

CROSS-REFERENCE TO RELATED APPLICATIONS

This application claims priority from Japanese Patent Application No. 2017-176565, filed Sep. 19, 2017, the content of which is incorporated herein by reference in its entirety.

TECHNICAL FIELD

The present invention relates to a Fourier spectroscopic analyzer.

BACKGROUND

A Fourier spectroscopic analyzer is a device that is used for analyzing a sample by emitting light including a plurality of wavelength components to the sample, receiving light that has passed through the sample, and acquiring a spectrum of light that has passed through the sample (for example, a wavenumber spectrum) by performing Fourier transform processing for an acquired light reception signal. A Fourier spectroscopic analyzer includes a light source that emits light including a plurality of wavelength components, an interferometer that acquires light (interference light; interferogram) to be emitted to a sample by causing the light emitted from the light source to interfere, a light receiver that receives light (reflected light or transmitted light) that has passed through the sample, and a signal processing device that performs the Fourier transform processing described above.

As the interferometer described above, for example, a Michelson interferometer including a half mirror, a fixed mirror, and a moving mirror can be used. This interferometer acquires an interferogram to be emitted to a sample by causing light emitted from a light source to branch into first branch light directed toward the half mirror and the fixed mirror and second branch light directed toward the moving mirror and causing the first branch light reflected by the fixed mirror and the second branch light reflected by the moving mirror to interfere with each other using the half mirror.

The following Non-Patent Literature 1 discloses one example of a Fourier spectroscopic analyzer of the related art. In particular, in the following Non-Patent Literature 1, a Fourier spectroscopic analyzer capable of eliminating the influence of environment variations such as temperature variations and the like by causing an interferogram to branch into two parts, individually receiving an interferogram through a sample and an interferogram not through a sample, acquiring spectrums by performing Fourier transform processing for acquired light reception signals, and performing a correction process using both the spectrums is disclosed.

[Non-Patent Literature 1]

Tomoaki Nanko and two others, "Near Infrared Spectral Analyzer InfraSpec NR800", Yokogawa technical report, Vol. 45, No. 3, 2001

The Fourier spectroscopic analyzer causes a change in an optical path difference representing a difference between an optical path length of the first branch light and an optical path length of the second branch light described above using the moving mirror disposed in the interferometer, thereby acquiring an interferogram that is modulated light. For this reason, it is premised that a sample, which is an analysis target of the Fourier spectroscopic analyzer, basically, has no change in the optical characteristics over time, or even in a case in which there is a change in the optical characteristics over time, the rate of the change is sufficiently lower than the movement speed of the moving mirror disposed in the interferometer.

However, in a case in which a Fourier spectroscopic analyzer is to be used in various fields, it can be assumed that a sample of which optical characteristics change relatively quickly with respect to the movement speed of the moving mirror described above will be an analysis target. For example, it can be assumed that, in an industrial process or a chemical process, a fluid material or a powder material in which particles are buoyant, a moving body having a surface on which a light scattering face having unevenness is formed, a suspended sample having fluidity that is stirred inside a stirring container, or the like will be an analysis target for the Fourier spectroscopic analyzer.

When a sample of which such optical characteristics change relatively quickly is to be analyzed by a Fourier spectroscopic analyzer, variations according to changes in the optical characteristics of the sample over time have occurred in an interferogram that has passed through the sample. In other words, modulation according to changes of the optical characteristics of the sample over time has been performed for the interferogram that has passed through the sample. Thereby, noise (so called "colored noise") in which many low-frequency components are included is superimposed on the interferogram that has passed through the sample. The noise superimposed on the interferogram appears as noise even when the Fourier transform processing is performed, and accordingly, there are cases in which analysis accuracy decreases.

SUMMARY

One or more embodiments provide a Fourier spectroscopic analyzer that realizes high analysis accuracy, even for a sample in which variations of the optical characteristics occur over time.

A Fourier spectroscopic analyzer according to one or more embodiments of the present invention may include: a light receiver configured to emit an interferogram that is interference light to a sample that is an analysis target and to output a first light reception signal acquired by receiving a wavelength component of a first wavelength band that is a wavelength band of which a spectrum is to be acquired among wavelength components included in light that has passed through the sample and a second light reception signal acquired by receiving a wavelength component of a second wavelength band different from the first wavelength band; and a signal processing device configured to perform a process of eliminating noise of the wavelength component of the first wavelength band and a process of acquiring the spectrum by Fourier transform processing using the first light reception signal and the second light reception signal.

In the Fourier spectroscopic analyzer described above, the signal processing device may include: a noise eliminator configured to perform a process of eliminating noise superimposed on the first light reception signal using the second light reception signal; and a Fourier transformer configured to acquire the spectrum of the wavelength component of the first wavelength band by performing Fourier transform processing for the first light reception signal from which noise has been eliminated through the process of the noise eliminator.

In the Fourier spectroscopic analyzer described above, the signal processing device may include: a Fourier transformer configured to acquire a first spectrum and a second spectrum by performing the Fourier transform processing respectively for the first light reception signal and the second light reception signal; and a noise eliminator configured to perform a process of eliminating noise superimposed on the first spectrum using the second spectrum.

In the Fourier spectroscopic analyzer described above, the light receiver may include: a first detector configured to receive a wavelength component of a third wavelength band including the first wavelength band and the second wavelength band; a second detector configured to receive the wavelength component of the third wavelength band; and a branch configured to cause the light that has passed through the sample to branch into a wavelength component of the first wavelength band that is incident on the first detector and a wavelength component of the second wavelength band that is incident on the second detector.

In the Fourier spectroscopic analyzer described above, the branch may include a dichroic mirror configured to reflect the wavelength component of the first wavelength band and to transmit the wavelength component of the second wavelength band.

In the Fourier spectroscopic analyzer described above, the branch may include a dichroic mirror configured to transmit the wavelength component of the first wavelength band and to reflect the wavelength component of the second wavelength band.

In the Fourier spectroscopic analyzer described above, the branch may include: a half mirror configured to cause the light that has passed through the sample to branch into first light to be directed toward the first detector and second light to be directed toward the second detector; a first filter configured to extract the wavelength component of the first wavelength band from a wavelength component included in the first light and to cause the extracted wavelength component to be incident on the first detector; and a second filter configured to extract the wavelength component of the second wavelength band from a wavelength component included in the second light and to cause the extracted wavelength component to be incident on the second detector.

In the Fourier spectroscopic analyzer described above, the light receiver may include: a first detector that has a higher detection sensitivity for the wavelength component of the first wavelength band than for the wavelength component of the second wavelength band; and a second detector that has a higher detection sensitivity for the wavelength component of the second wavelength band than for the wavelength component of the first wavelength band.

In the Fourier spectroscopic analyzer described above, the first detector and the second detector may be disposed in this order on an optical path of the light passing through the sample.

In the Fourier spectroscopic analyzer described above, the light receiver may be configured to receive transmitted light that has been transmitted through the sample.

In the Fourier spectroscopic analyzer described above, the light receiver may be configured to receive reflected light that has been reflected by the sample.

In the Fourier spectroscopic analyzer described above, the noise eliminator may be configured to perform a process of eliminating noise caused by changes over time that is superimposed on the first light reception signal.

In the Fourier spectroscopic analyzer described above, the noise eliminator may be configured to perform a process of eliminating noise superimposed on the first light reception signal by performing a process of subtracting the second light reception signal from the first light reception signal.

In the Fourier spectroscopic analyzer described above, the noise eliminator may be configured to perform a process of eliminating noise caused by changes over time that is superimposed on the first spectrum.

In the Fourier spectroscopic analyzer described above, the noise eliminator may be configured to perform a process of eliminating noise superimposed on the first light spectrum by performing a process of subtracting the second spectrum from the first spectrum.

According to one or more embodiments of the present invention, a first light reception signal is acquired by receiving a wavelength component of a first wavelength band that is a wavelength band of which a spectrum is to be acquired among wavelength components included in light passing through the sample, a second light reception signal is acquired by receiving a wavelength component of a second wavelength band different from the first wavelength band, and a process of acquiring the spectrum from which noise of the wavelength component of the first wavelength band is eliminated is performed using the first light reception signal and the second light reception signal. Accordingly, high analysis accuracy can be realized even for a sample in which variations of optical characteristics over time occur.

DETAILED DESCRIPTION

Hereinafter, a Fourier spectroscopic analyzer according to one or more embodiments of the present invention will be described in detail with reference to the drawings.

<Configuration of Main Part of Fourier Spectroscopic Analyzer>

Figure 1:
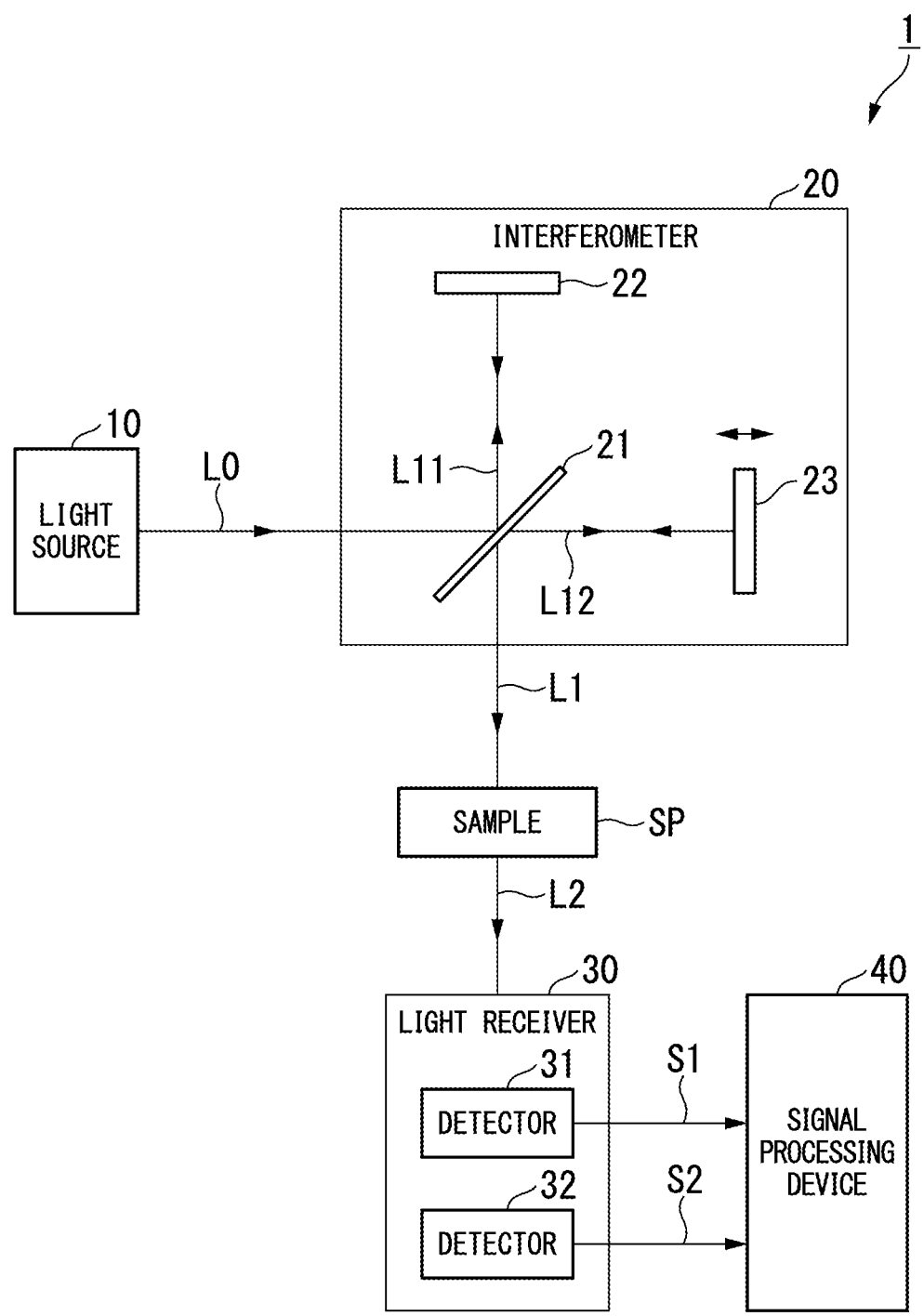
FIG. 1 is a block diagram showing the configuration of a main part of a Fourier spectroscopic analyzer according to one or more embodiments of the present invention.

FIG. 1 is a block diagram showing the configuration of a main part of a Fourier spectroscopic analyzer according to one or more embodiments of the present invention. As shown in FIG. 1, a Fourier spectroscopic analyzer 1 according to one or more embodiments includes a light source 10, an interferometer 20, a light receiver 30, and a signal processing device 40. The Fourier spectroscopic analyzer 1 emits light L1 including a plurality of wavelength components to a sample SP, receives light L2 through the sample SP, and acquires a spectrum (for example, a wavenumber spectrum) of the light L2 through the sample SP by performing Fourier transform processing for acquired light reception signals S1 and S2, thereby analyzing the sample SP.

Although the sample SP described above may be an arbitrary object, in one or more embodiments, the sample may be an object of which optical characteristics change over time. For example, in an industrial process or a chemical process, the sample is a fluid material or a powder material in which particles are buoyant, a moving body having a surface on which a light scattering face having unevenness is formed, a suspended sample having fluidity that is stirred inside a stirring container, or the like. As the light L2 through the sample SP described above, although there are reflected light that has been reflected by the sample SP and transmitted light that has been transmitted through the sample SP, the light is assumed to be transmitted light that has been transmitted through the sample SP in one or more embodiments.

The light source 10 is a light source that emits light L0 including a plurality of wavelength components. As this light source 10, an arbitrary light source according to optical characteristics of a sample SP can be used. For example, a light source having a broad wavelength bandwidth such as a halogen lamp or a light source including a semiconductor light emitting device such as a laser diode (LD) or a light emitting diode (LED) can be used. In one or more embodiments, it is assumed that a halogen lamp is used as the light source 10. For example, a wavelength bandwidth of the halogen lamp is in a wavelength range of about 350 to 4,500 [nm].

The interferometer 20 acquires light (interference light; interferogram) L1 to be emitted to a sample by causing the light L0 emitted from the light source 10 to interfere with each other. As the interferometer 20, although an arbitrary interferometer can be used, the interferometer 20 is assumed to be a Michelson interferometer including a half mirror 21, a fixed mirror 22, and a moving mirror 23 in one or more embodiments.

The half mirror 21 causes the light L0 emitted from the light source 10 to branch into branch light L11 directed toward the fixed mirror 22 and branch light L12 directed toward the moving mirror 23. For example, the half mirror 21 causes the light L0 emitted from the light source 10 to branch at an intensity ratio of 1:1. The half mirror 21 causes the branch light L11 reflected by the fixed mirror 22 and the branch light L12 reflected by the moving mirror 23 to interfere with each other, thereby acquiring an interferogram L1.

The fixed mirror 22 is disposed on an optical path of the branch light L11 in a state in which a reflection face thereof is directed toward the half mirror 21. The fixed mirror 22 reflects the branch light L11 branching on the half mirror 21 toward the half mirror 21. The moving mirror 23 is disposed on an optical path of the branch light L12 in a state in which a reflection face thereof is directed toward the half mirror 21. The moving mirror 23 reflects the branch light L12 that has branched on the half mirror 21 toward the half mirror 21. The moving mirror 23 is configured to be able to reciprocate along an optical path of the branch light L12 in accordance with a drive mechanism not shown in the drawing. For example, the reciprocation speed of the moving mirror 23 is set to about five times per second.

In accordance with reciprocation of the moving mirror 23, wavelength components included in the light L0 emitted from the light source 10 are intensity-modulated with different frequencies. For example, a wavelength component of which a wavelength is relatively short is intensity-modulated with a higher frequency than a wavelength component of which a wavelength is relatively long. In an interferogram L1 acquired by the interferometer 20, wavelength components that are intensity-modulated with such different frequencies overlap each other.

The light receiver 30 includes a detector 31 (a first detector) and a detector 32 (a second detector). The light receiver 30 receives light (transmitted light of the interferogram L1) L2 that has been transmitted through the sample SP and outputs a light reception signal S1 (a first light reception signal) and a light reception signal S2 (a second light reception signal). The detector 31 receives a wavelength component of the wavelength band (a first wavelength band) of which a spectrum is acquired and outputs a light reception signal S1. The detector 32 receives a wavelength component of a wavelength band (a second wavelength band) different from the wavelength band described above of which the spectrum described above is acquired and outputs a light reception signal S2.

The detector 31 is disposed to acquire a spectrum of a wavelength band (a first wavelength band) that is an analysis target defined in advance, and the detector 32 is disposed to acquire noise caused by changes in the optical characteristics of the sample SP over time. When the Fourier spectroscopic analyzer 1 is designed, the first wavelength band can be set to an arbitrary wavelength band. In one or more embodiments, the first wavelength band is assumed to be about 1 to 2.5 [μm], and the second wavelength band is assumed to be about 0.5 to 1 [μm].

The detectors 31 and 32 may be of the same type or of different types. For example, any one of the detectors 31 and 32 may be able to receive wavelength components of a wavelength band (a third wavelength band) including the first wavelength band and the second wavelength band and may be of the same type. Alternatively, the detector 31 may have a higher detection sensitivity for a wavelength component of the first wavelength band than for a wavelength component of the second wavelength band, the detector 32 may have a higher detection sensitivity for the wavelength component of the second wavelength band than for the wavelength component of the first wavelength band, and the detectors 31 and 32 may be of different types.

In a case in which the detectors 31 and 32 of different types are used, it is necessary to cause the wavelength component of the first wavelength band to be incident on the detector 31 and cause the wavelength component of the second wavelength band to be incident on the detector 32 by disposing a branch (details thereof will be described later) used for branching into the first wavelength band and the second wavelength band. On the other hand, in a case in which the detectors 31 and 32 of different types are used, a unit that is similar to the branch described above may be disposed, or the branch described above may be omitted.

The signal processing device 40 performs a process of acquiring a spectrum in which noise caused by changes in the optical characteristics of a sample SP over time is eliminated using the light reception signal S1 output from the detector 31 of the light receiver 30 and the light reception signal S2 output from the detector 32. The signal processing device 40 outputs a signal representing the spectrum acquired through the process described above to the outside or causes a display device (for example, a liquid crystal display device) not shown in the drawing to display the spectrum.

<First Example of Light Receiver>

Figure 2A:
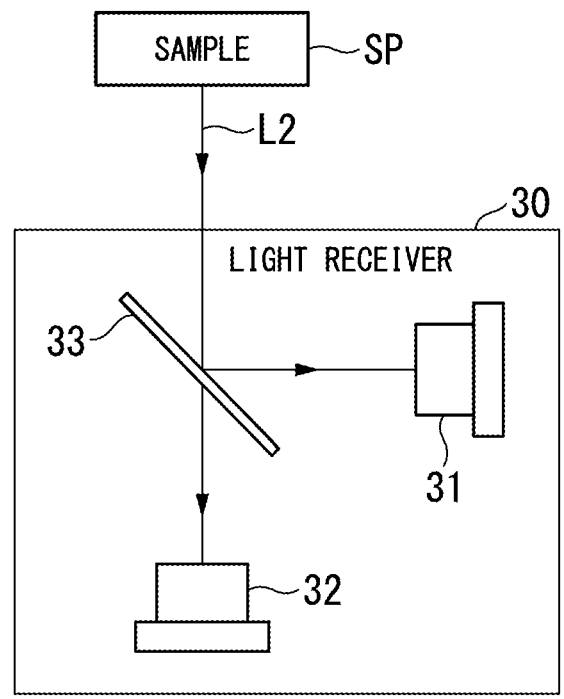
FIG. 2A is a block diagram showing a first example of a light receiver included in a Fourier spectroscopic analyzer according to one or more embodiments of the present invention.

FIG. 2A is a block diagram showing a first example of a light receiver included in a Fourier spectroscopic analyzer according to one or more embodiments of the present invention. As shown in FIG. 2A, the light receiver 30 of this example includes a dichroic mirror 33 (a branch part) in addition to the detectors 31 and 32. In this example, any one of the detectors 31 and 32 is assumed to be able to receive a wavelength component of a wavelength band (a third wavelength band) including the first wavelength band and the second wavelength band.

Figure 2B:
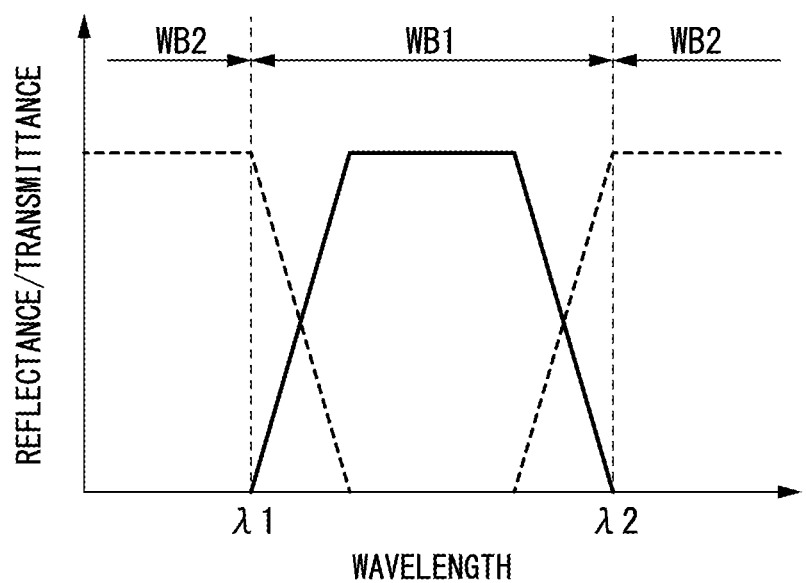
FIG. 2B is a diagram showing optical characteristics of a light receiver of a first example included in a Fourier spectroscopic analyzer according to one or more embodiments of the present invention.

The dichroic mirror 33, as shown in FIG. 2B, has such optical characteristics that a wavelength component of the first wavelength band WB1 among wavelength components included in the light L2 through the sample SP is reflected, and a wavelength component of the second wavelength band WB2 is transmitted. This dichroic mirror 33 ideally has such optical characteristics that the wavelength components of the first wavelength band WB1 are completely reflected, and the wavelength components of the second wavelength band WB2 are completely transmitted but, as shown in FIG. 2B, may have such optical characteristics that some wavelength components of the first wavelength band WB1 are transmitted.

For example, as shown in FIG. 2B, the dichroic mirror 33 may have such optical characteristics that the reflectance gradually decreases for wavelength component, in other words, the transmittance gradually increases for wavelength components at both ends of the first wavelength band WB1, in other words, wavelength components having wavelengths close to wavelengths λ1 and λ2 defining boundaries between the first wavelength band WB1 and the second wavelength band WB2. In FIG. 2B, for easy understanding, the optical characteristics of the dichroic mirror 33 at both ends of the first wavelength band WB1 are shown to be exaggerated.

In a case in which the arrangement of the detectors 31 and 32 are reversed, a dichroic mirror 33 of which optical characteristics are reversed may be used. In other words, in a case in which the detector 31 is disposed at the position of the detector 32 shown in FIG. 2A, and the detector 32 is disposed at the position of the detector 31 shown in FIG. 2A, a dichroic mirror 33 having such optical characteristics that the wavelength components of the first wavelength band WB1 among wavelength components included in the light L2 through the sample SP are transmitted, and the wavelength components of the second wavelength band WB2 are reflected may be used.

<Second Example of Light Receiver>

Figure 3A:
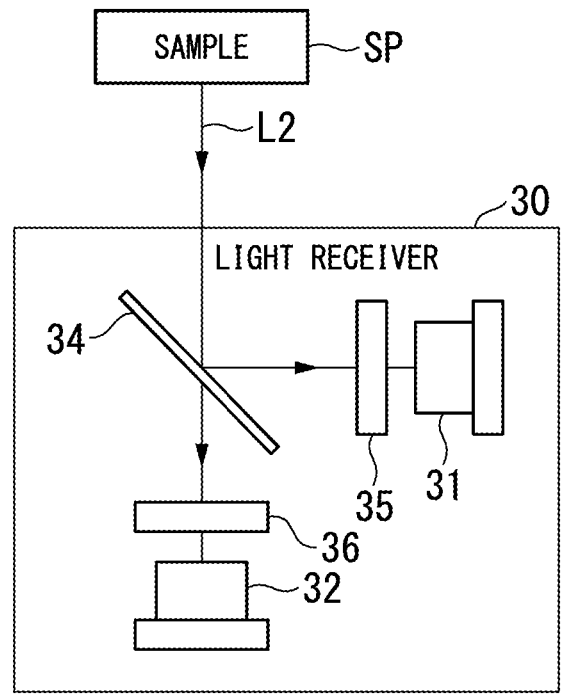
FIG. 3A is a block diagram showing a second example of a light receiver included in a Fourier spectroscopic analyzer according to one or more embodiments of the present invention.

FIG. 3A is a block diagram showing a second example of a light receiver included in a Fourier spectroscopic analyzer according to one or more embodiments of the present invention. As shown in FIG. 3A, a light receiver 30 of this example includes a half mirror 34 (a branch), a filter 35 (a branch; a first filter) and a filter 36 (a branch; a second filter) in addition to the detectors 31 and 32. In this example, similar to one or more embodiments described above, any one of the detectors 31 and 32 is assumed to be able to receive wavelength components of a wavelength band (a third wavelength band) including the first wavelength band and the second wavelength band.

Figure 3B:
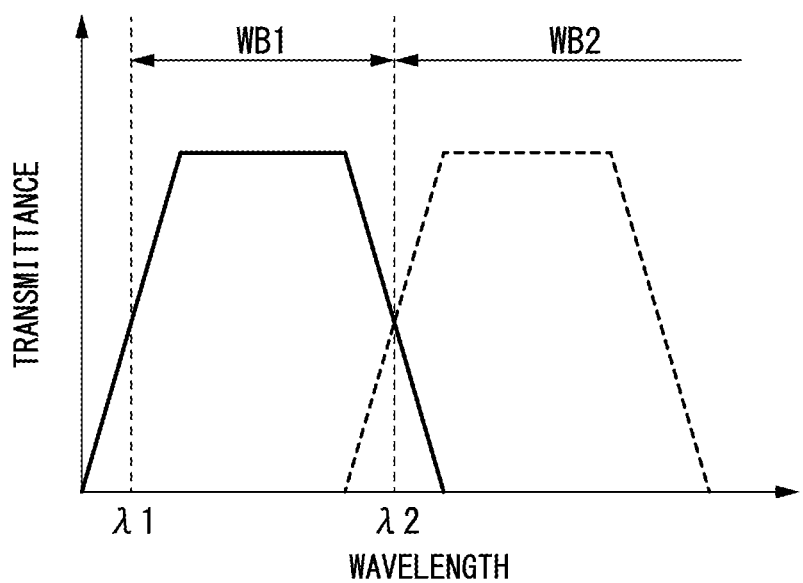
FIG. 3B is a diagram showing optical characteristics of a light receiver of a second example included in a Fourier spectroscopic analyzer according to one or more embodiments of the present invention.

The half mirror 34 causes light L2 through a sample SP to branch into light (first light) directed toward the detector 31 and light (second light) directed toward the detector 32. The filter 35 is disposed on an optical path between the half mirror 34 and the detector 31. As shown in FIG. 3B, the filter 35 has such optical characteristics that wavelength components of the first wavelength band WB1 are transmitted, and wavelength components of the second wavelength band WB2 are not transmitted. In other words, the filter 35 has such optical characteristics that wavelength components of the first wavelength band WB1 are extracted and are caused to be incident on the detector 31. The filter 36 is disposed on an optical path between the half mirror 34 and the detector 32. As shown in FIG. 3B, the filter 36 has such optical characteristics that the wavelength components of the second wavelength band WB2 are transmitted, and the wavelength components of the first wavelength band WB1 are not transmitted. In other words, the filter 36 has such optical characteristics that the wavelength components of the second wavelength band WB2 are extracted and are caused to be incident on the detector 32.

Ideally, the filter 35 has such optical characteristics that only wavelength components of the first wavelength band WB1 are transmitted, and the filter 36 ideally has such optical characteristics that only the wavelength components of the second wavelength band WB2 are transmitted. However, as shown in FIG. 3B, the filter 35 may have such optical characteristics that some wavelength components of the second wavelength band WB2 are transmitted to some degree, and the filter 36 may have such optical characteristics that some wavelength components of the first wavelength band WB1 are transmitted to some degree. In FIG. 3B, for easy understanding, optical characteristics of the filters 35 and 36 near the wavelength λ2 defining a boundary between the first wavelength band WB1 and the second wavelength band WB2 are shown to be exaggerated.

In a case in which the arrangement of the detectors 31 and 32 are reversed, also the arrangement of the filters 35 and 36 may be reversed. In other words, in a case in which the detector 31 is disposed at the position of the detector 32 shown in FIG. 3A, and the detector 32 is disposed at the position of the detector 31 shown in FIG. 3A, the filter 35 may be disposed at the position of the filter 36 shown in FIG. 3A, and the filter 36 may be disposed at the position of the filter 35 shown in FIG. 3A.

<Third Example of Light Receiver>

Figure 4A:
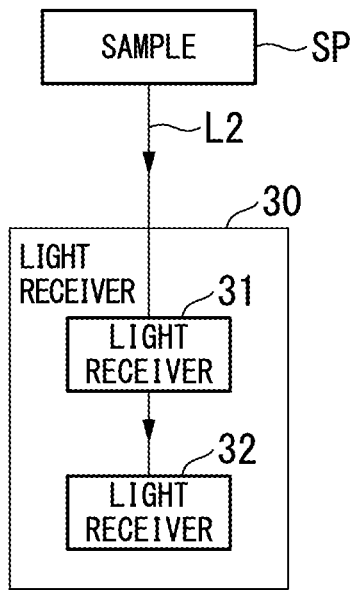
FIG. 4A is a block diagram showing a third example of a light receiver included in a Fourier spectroscopic analyzer according to one or more embodiments of the present invention.
Figure 4B:
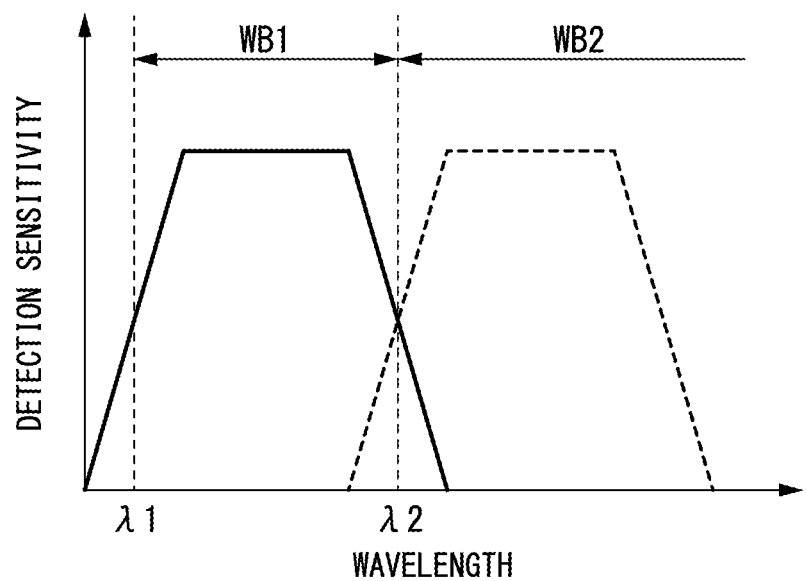
FIG. 4B is a diagram showing optical characteristics of a light receiver of a third example included in a Fourier spectroscopic analyzer according to one or more embodiments of the present invention.

FIG. 4A is a block diagram showing a third example of a light receiver included in a Fourier spectroscopic analyzer according to one or more embodiments of the present invention. As shown in FIG. 4A, the light receiver 30 of this example, includes detectors 31 and 32 that are orderly arranged on an optical path of light L2 through the sample SP. In this example, as shown in FIG. 4B, it is assumed that the detector 31 has a higher detection sensitivity for wavelength components of the first wavelength band WB1 than for wavelength components of the second wavelength band WB2, and the detector 32 has a higher detection sensitivity for wavelength components of the second wavelength band WB2 than for wavelength components of the first wavelength band WB1.

In this example, as the detector 31, for example, an InGaAs (indium.gallium.arsenic) photodiode can be used. As the detector 32, a Si (silicon) photodiode may be used. The InGaAs photodiode has high detection sensitivity for light of a wavelength band of about 1 to 2.5 [μm]. The Si photodiode has high detection sensitivity for light having a wavelength band of about 0.3 to 1 [μm].

In the light receiver 30 of this example, when light L2 through the sample SP is incident on the detector 31, wavelength components of the first wavelength band WB1 are absorbed and are converted into a light reception signal S1, and when light that has passed through the detector 31 (that has been transmitted) is incident on the detector 32, and, when light that has passed through the detector 31 (that has been transmitted) is incident on the detector 32, the wavelength components of the second wavelength bands WB2 are absorbed and are converted into a light reception signal S2. The arrangement order of the detectors 31 and 32 on the optical path of the light L2 passing through the sample SP may be reversed. The detectors 31 and 32 may be disposed in an overlapping state on the optical path of the light L2 passing through the sample SR As such detectors, for example, detectors that have been disclosed in PCT Publication No. 2011/065057 can be used.

<First Example of Signal Processing Device>

Figure 5:
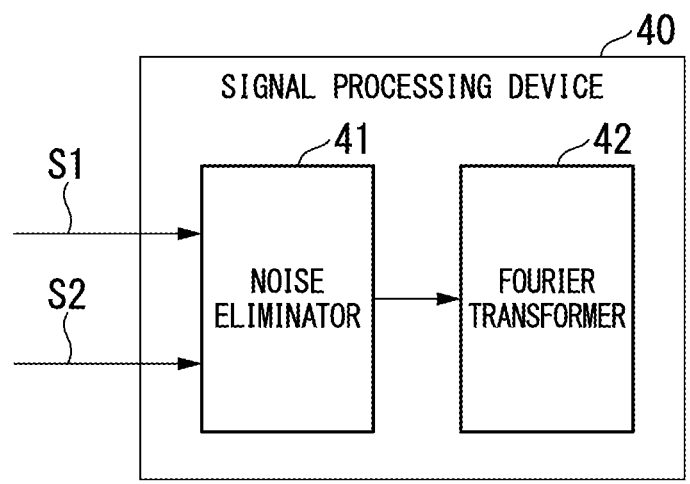
FIG. 5 is a block diagram showing a first example of a signal processing device included in a Fourier spectroscopic analyzer according to one or more embodiments of the present invention.

FIG. 5 is a block diagram showing a first example of a signal processing device included in a Fourier spectroscopic analyzer according to one or more embodiments of the present invention. As shown in FIG. 5, the signal processing device 40 includes a noise eliminator 41 that receives light reception signals S1 and S2 and a Fourier transformer 42 that receives an output signal of the noise eliminator 41.

The noise eliminator 41 performs a process of eliminating noise superimposed on the light reception signal S1 using the light reception signal S2. For example, the noise eliminator 41 eliminates noise superimposed on the light reception signal S1 by performing a process of subtracting the light reception signal S2 from the light reception signal S1. The process performed by the noise eliminator 41 may be an arbitrary process as long as it can eliminate noise superimposed on the light reception signal S1 and is not limited to the process of subtracting the light reception signal S2 from the light reception signal S1.

The Fourier transformer 42 acquires a spectrum of wavelength components of the first wavelength band by performing Fourier transform processing for a signal output from the noise eliminator 41. The signal output from the noise eliminator 41 is a signal in which noise caused by changes in the optical characteristics of the sample SP over time is eliminated. For this reason, in the spectrum of the wavelength components of the first wavelength band acquired by the Fourier transformer 42, noise caused by changes in the optical characteristics of the sample SP over time is eliminated.

<Second Example of Signal Processing Device>

Figure 6:
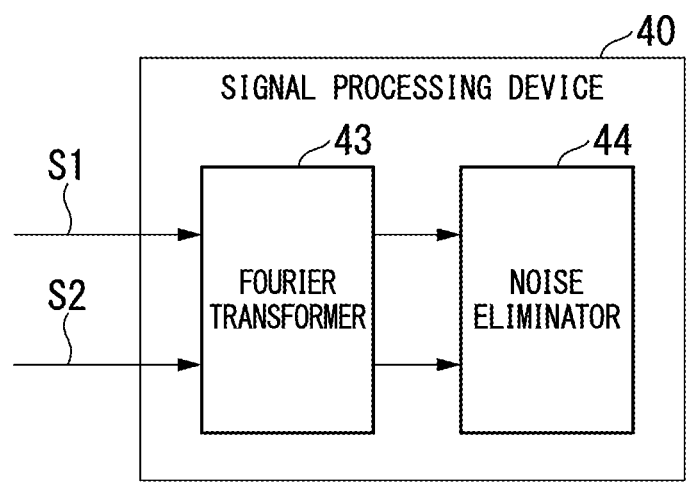
FIG. 6 is a block diagram showing a second example of a signal processing device included in a Fourier spectroscopic analyzer according to one or more embodiments of the present invention.

FIG. 6 is a block diagram showing a second example of a signal processing device included in a Fourier spectroscopic analyzer according to one or more embodiments of the present invention. As shown in FIG. 6, the signal processing device 40 of this example includes a Fourier transformer 43 that receives light reception signals S1 and S2 and a noise eliminator 44 that receives an output signal of the Fourier transformer 43.

The Fourier transformer 43 performs Fourier transform processing respectively for a light reception signal S1 and a light reception signal S2, thereby acquiring a spectrum (a first spectrum) of the light reception signal S1 and a spectrum (a second spectrum) of the light reception signal S2. Since the noise caused by changes in the optical characteristics of the sample SP over time is similarly superimposed in the light reception signals S1 and S2, the noise caused by the changes in the optical characteristics of the sample SP over time is superimposed in the spectrums of the light reception signals S1 and S2 acquired by the Fourier transformer 43.

The noise eliminator 44 performs a process of eliminating noise superimposed on the spectrum of the light reception signal S1 using the spectrum of the light reception signal S2. For example, the noise eliminator 44 eliminates noise superimposed on the spectrum of the light reception signal S1 by performing a process of subtracting the spectrum of the light reception signal S2 from the spectrum of the light reception signal S1. The process performed by the noise eliminator 44 may be an arbitrary process as long as it can eliminate noise superimposed in the spectrum of the light reception signal S1 but is not limited to the process of subtracting the spectrum of the light reception signal S2 from the spectrum of the light reception signal S1.

<Operation of Fourier Spectroscopic Analyzer>

Next, an operation of the Fourier spectroscopic analyzer in the configuration described above will be described. Hereinafter, for easy understanding, the signal processing device 40 disposed in the Fourier spectroscopic analyzer 1 is assumed to be that shown in FIG. 6. In a case in which the signal processing device 40 disposed in the Fourier spectroscopic analyzer 1 is that shown in FIG. 5, although the process performed by the signal processing device 40 is different, a result (spectrum) that is similar to that shown in FIG. 6 can be acquired.

When light L0 including a plurality of wavelength components is emitted from the light source 10, the light L0 is incident on the interferometer 20. The light L0 incident on the interferometer 20 branches into branch light L11 directed toward the fixed mirror 22 and branch light L12 directed toward the moving mirror 23 in accordance with the half mirror 21. The branch light L11 caused to branch by the half mirror 21 is reflected by the fixed mirror 22 and is incident on the half mirror 21 by traveling along an optical path for arriving at the fixed mirror 22 from the half mirror 21 in a reverse direction. The branch light L12 caused to branch by the half mirror 21 is reflected by the moving mirror 23 and is incident on the half mirror 21 by traveling along an optical path for arriving at the moving mirror 23 from the half mirror 21 in a reverse direction. When the branch light L11 and the branch light L12 are incident on the half mirror 21, they interfere with each other, and accordingly, an interferogram L1 is acquired.

Since the moving mirror 23 disposed in the interferometer 20 reciprocates, wavelength components included in the light L0 emitted from the light source 10 are intensity-modulated with different frequencies. For example, a wavelength component having a relatively short wavelength is intensity-modulated with a higher frequency than a wavelength component having a relatively long wavelength. An interferogram L1 in which wavelength components intensity-modulated with such different frequencies are superimposed is acquired by the interferometer 20.

The interferogram L1 acquired by the interferometer 20 is emitted to the sample SP, and transmitted light that has been transmitted through the sample SP is incident on the light receiver 30 as light L2. When the optical characteristics of the sample SP change over time, so to speak, modulation according to changes in the optical characteristics of the sample SP over time has been performed for the light L2 passing through the sample SR Thereby, noise (so called "colored noise") in which many low frequency components are included is superimposed on the light L1 that has passed through the sample SR All the wavelength components included in the light L2 that has passed through the sample SP are similarly modulated in accordance with changes in the optical characteristics of the sample SP over time, and it should be noted that similar noise is superimposed in all the wavelength components included in the light L2 that has passed through the sample SP.

Figure 7A:
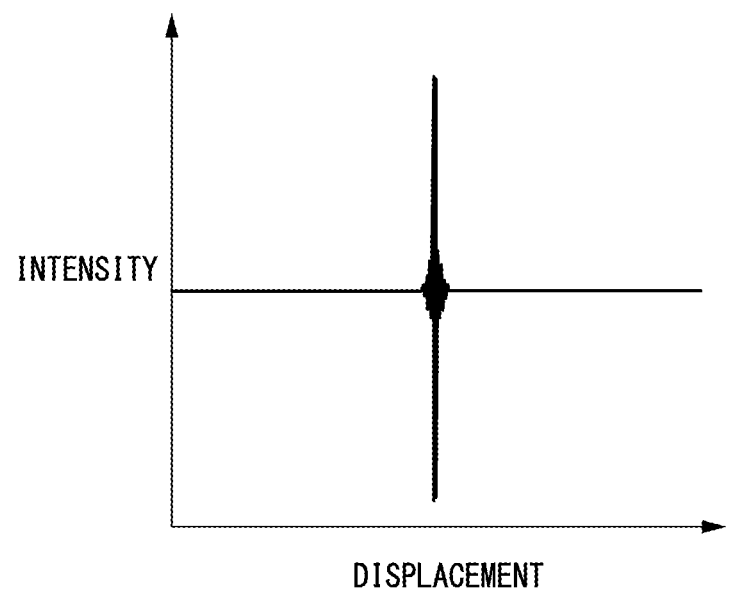
FIG. 7A is a diagram showing one example of an interferogram through a sample according to one or more embodiments of the present invention.
Figure 7B:
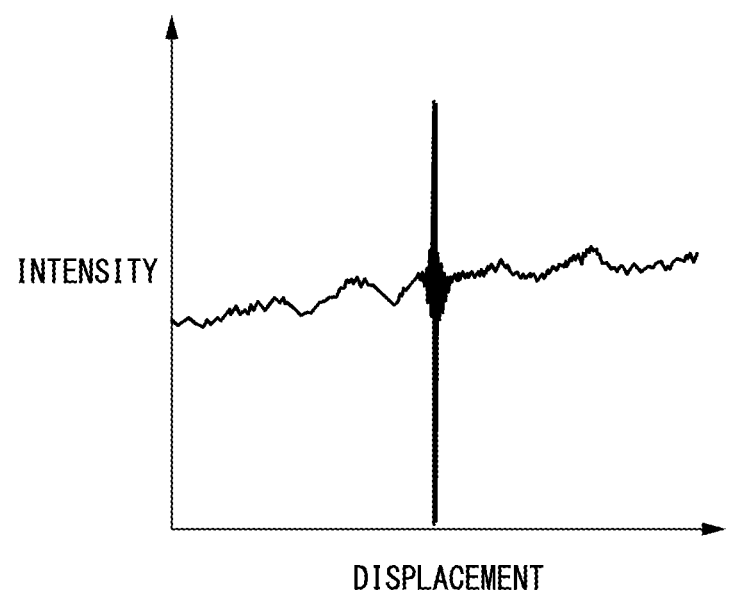
FIG. 7B is a diagram showing one example of an interferogram through a sample according to one or more embodiments of the present invention.
Figure 7C:
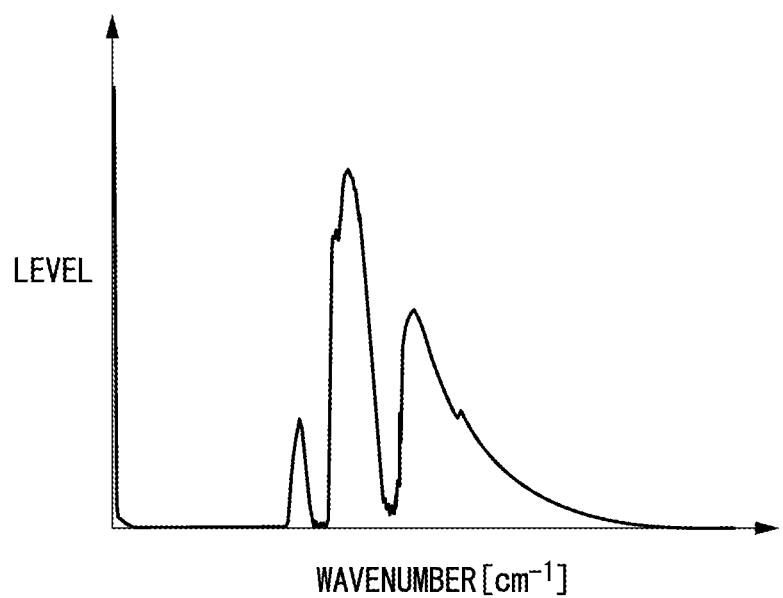
FIG. 7C is a diagram showing one example of an interferogram through a sample according to one or more embodiments of the present invention.
Figure 7D:
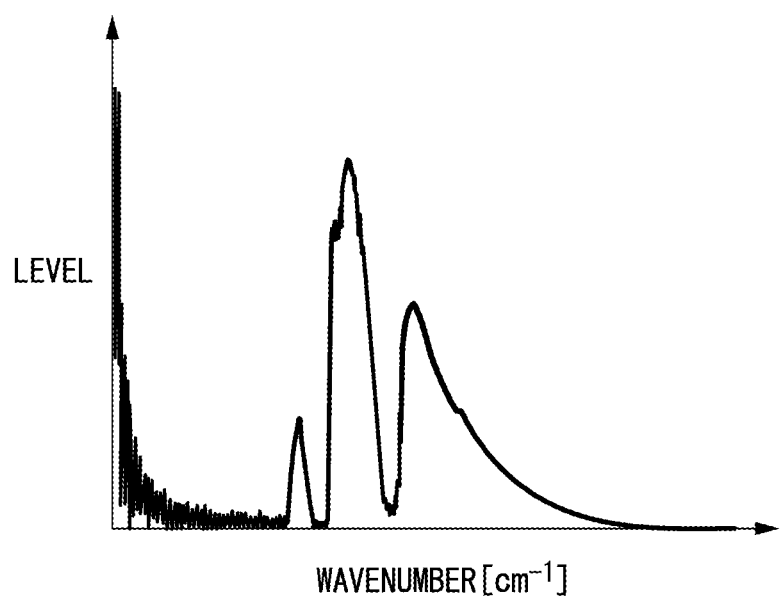
FIG. 7D is a diagram showing one example of an interferogram through a sample according to one or more embodiments of the present invention.

FIGS. 7A to 7D are diagrams showing one example of an interferogram that has passed through a sample according to one or more embodiments of the present invention. FIG. 7A shows a case in which the optical characteristics of a sample SP do not change over time. FIG. 7B shows a case in which the optical characteristics of a sample SP change over time. In FIGS. 7A and 7B, the horizontal axis represents a displacement of the moving mirror 23 included in the interferometer 20, and the vertical axis represents an intensity of the interferogram. FIG. 7C is a diagram showing a spectrum (a wavenumber spectrum) of the interferogram shown in FIG. 7A, and FIG. 7D is a diagram showing a spectrum (a wavenumber spectrum) of the interferogram shown in FIG. 7B.

An interferogram that has passed through the sample SP of which optical characteristics do not change over time, as shown in FIG. 7A, has a typical shape in which a so-called a center burst occurs. In other words, the intensity becomes a maximum when the displacement of the moving mirror 23 is a specific displacement (a displacement for which a difference between optical paths of the branch light L11 and the branch light L12 becomes zero), and the intensity becomes extremely small (almost zero) for the other displacements. The wavenumber spectrum of the interferogram that has passed through the sample SP of which optical characteristics do not change over time, as shown in FIG. 7C, has a shape corresponding to the optical characteristics (absorption characteristics) of the sample SP and is a smooth spectrum on which no noise is superimposed.

On the other hand, an interferogram that has passed through a sample SP of which optical characteristics change over time, as shown in FIG. 7B, is the same as that shown in FIG. 7A in the point of view of a so-called center burst occurring. However, when the displacement of the moving mirror 23 is a displacement other than the specific displacement described above, the intensity does not become almost zero due to changes in the optical characteristics of the sample SP over time but varies. In the wavenumber spectrum of the interferogram that has passed through the sample SP of which optical characteristics change over time, as shown in FIG. 7D, noises are superimposed. For example, noises (so-called "colored noises") in which many components having small wavenumbers (low frequency components) are included are superimposed.

A wavelength component of the light L2 incident on the light receiver 30 that is included in the first wavelength band is received by the detector 31, and a light reception signal S1 is output from the detector 31. A wavelength component of the light L2 incident on the light receiver 30 that is included in the second wavelength band is received by the detector 32, and a light reception signal S2 is output from the detector 32. The light reception signal S1 output from the detector 31 and the light reception signal S2 output from the detector 32 are input to the signal processing device 40 shown in FIG. 6.

When the light reception signals S1 and S2 are input to the signal processing device 40, first, the Fourier transformer 43 performs a process of acquiring a spectrum of the light reception signal S1 and a spectrum of the light reception signal S2 by performing Fourier transform processing respectively for the light reception signal S1 and the light reception signal S2. The spectrums (the spectrum of the light reception signal S1 and the spectrum of the light reception signal S2) acquired by the Fourier transformer 43 are output to the noise eliminator 44, and a process of eliminating noise superimposed on the spectrum of the light reception signal S1 is performed using the spectrum of the light reception signal S2. For example, a process of subtracting the spectrum of the light reception signal S2 from the spectrum of the light reception signal S1 is performed by the noise eliminator 44. By performing such a process, a spectrum (a spectrum of wavelength components of the first wavelength band) in which noise caused by changes in the optical characteristics of the sample SP over time is eliminated is acquired.

Figure 8A:
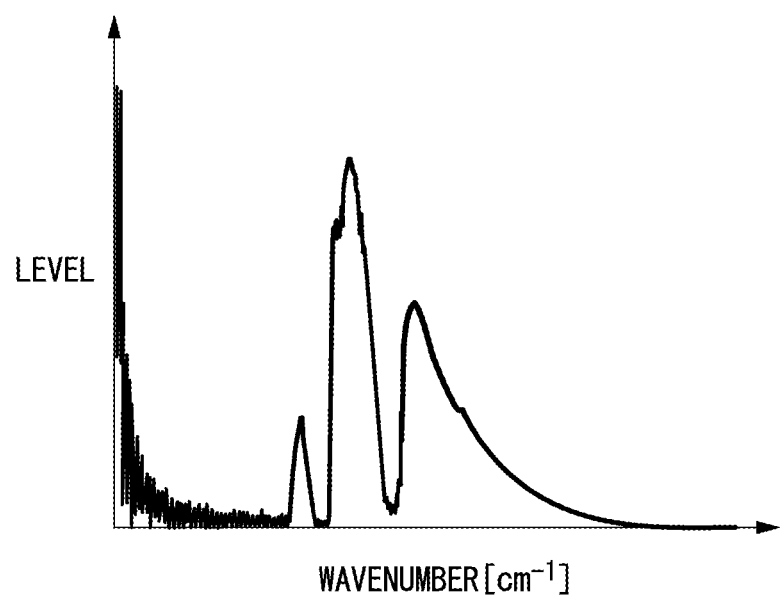
FIG. 8A is a diagram showing a principle of eliminating noise according to one or more embodiments of the present invention.
Figure 8B:
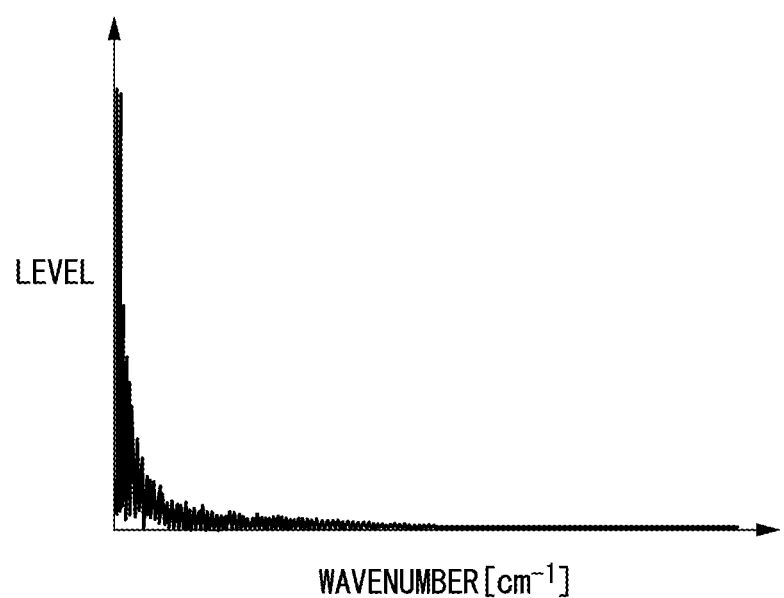
FIG. 8B is a diagram showing a principle of eliminating noise according to one or more embodiments of the present invention.
Figure 8C:
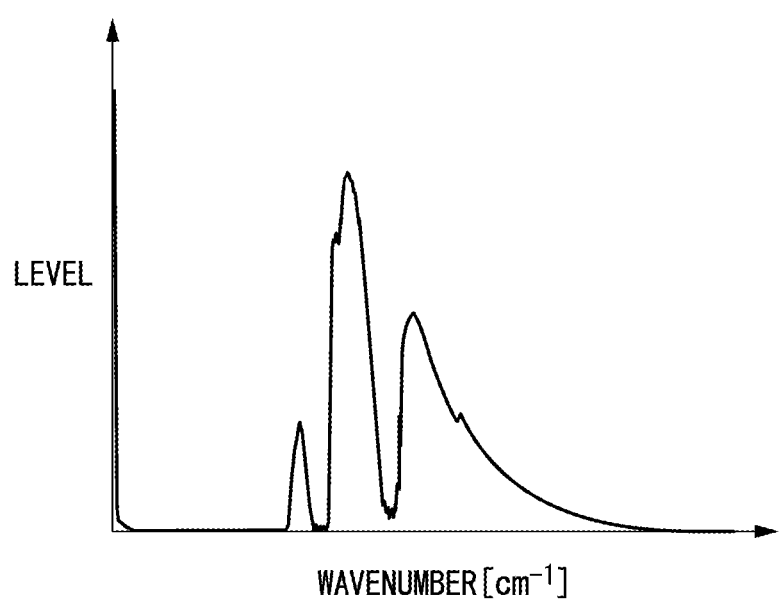
FIG. 8C is a diagram showing a principle of eliminating noise according to one or more embodiments of the present invention.

FIGS. 8A to 8C are diagrams showing a principle of eliminating noise according to one or more embodiments of the present invention. FIG. 8A is a diagram showing one example of the spectrum of a light reception signal S1, and FIG. 8B is a diagram showing one example of the spectrum of a light reception signal S2. The light reception signal S1 output from the detector 31 is a signal acquired by receiving wavelength components included in the first wavelength band, and noise caused by changes in the optical characteristics of the sample SP over time is superimposed on this light reception signal S1. For this reason, the spectrum of the light reception signal S1 acquired by the Fourier transformer 43, as shown in FIG. 8A, has a shape corresponding to the optical characteristics (absorption characteristics) of the sample SP and has noise caused by changes of the optical characteristics of the sample SP over time superimposed therein.

On the other hand, the light reception signal S2 output from the detector 32 is a signal acquired by receiving wavelength components included in the second wavelength band different from the first wavelength band, and noise similar to the noise superimposed on the light reception signal S1 is superimposed on this light reception signal S2. For this reason, the spectrum of the light reception signal S2 acquired by the Fourier transformer 43, as shown in FIG. 8B, represents a spectrum of noise caused by changes in the optical characteristics of the sample SP over time. The reason for the spectrum of the light reception signal S2 being such a spectrum is that all the wavelength components included in the light L2 that has passed through the sample SP are similarly modulated in accordance with changes in the optical characteristics of the sample SP over time, and accordingly, similar noise is superimposed in all the wavelength components included in the light L2 that has passed through the sample SP.

Accordingly, for example, by performing a process of subtracting the spectrum of the light reception signal S2 shown in FIG. 8B from the spectrum of the light reception signal S1 shown in FIG. 8A using the noise eliminator 44, as shown in FIG. 8C, a spectrum (a spectrum of wavelength components of the first wavelength band) in which noise caused by changes in the optical characteristics of the sample SP over time is eliminated is acquired. On the basis of such a principle, the noise caused by changes in the optical characteristics of the sample SP over time is eliminated.

As described above, in one or more embodiments, the interferogram L1 acquired by the interferometer 20 is emitted to the sample SP, a light reception signal S1 is acquired by receiving wavelength components of the first wavelength band that is a wavelength band for which a spectrum is to be acquired among wavelength components included in the light L2 that has passed through the sample SP, a light reception signal S2 is acquired by receiving wavelength components of the second wavelength band different from the first wavelength band, and a spectrum in which noise of the wavelength components of the first wavelength band is eliminated is acquired using these light reception signals S1 and S2. In this way, in one or more embodiments, since noise caused by variations of the optical characteristics of the sample SP over time is eliminated, even when there are variations in the optical characteristics of the sample SP over time, high analysis accuracy can be realized.

As above, while the Fourier spectroscopic analyzer 1 according to one or more embodiments of the present invention has been described, the present invention can be freely changed within the scope of the present invention without being limited to the embodiments described above. For example, in one or more embodiments described above, an example in which the signal processing device 40 directly performs the process using the light reception signals S1 and S2 output from the detectors 31 and 32 has been described. However, the light reception signals S1 and S2 output from the detectors 31 and 32 may be stored in a memory, and the process of the signal processing device 40 may be performed later.

REFERENCE SIGNS LIST

1 Fourier spectroscopic analyzer
30 light receiver
31, 32 detector
33 dichroic mirror
34 half mirror
35, 36 filter
40 signal processing device
41, 44 noise eliminator
42, 43 Fourier transformer
L1 interferogram
L2 light
S1, S2 light reception signal
SP sample
WB1 first wavelength band
WB2 second wavelength band Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A Fourier spectroscopic analyzer comprising:
an interferometer that emits an interferogram to a sample, wherein the interferogram is interference light and the sample is an analysis target;
a light receiver that:
receives a first wavelength component of a first wavelength band and a second wavelength component of a second wavelength band among wavelength components included in transmitted light of the interferogram that has passed through the sample or in reflected light of the interferogram that has been reflected by the sample,
outputs a first light reception signal acquired by receiving the first wavelength component and a second light reception signal acquired by receiving the second wavelength component, wherein the first wavelength band is a wavelength band of which a spectrum is acquired, and the second wavelength band is different from the first wavelength band; and
a signal processing device that:
eliminates noise superimposed on the first wavelength component and on the first light reception signal, wherein the noise is caused by changes in optical characteristics of the sample over time;
acquires the spectrum of the first wavelength component by Fourier transform processing using the first light reception signal and the second light reception signal;
eliminates the noise superimposed on the first light reception signal by subtracting the second light reception signal from the first light reception signal; and
applies the Fourier transform processing on the noise-eliminated first light reception signal to acquire the spectrum of the first wavelength component.

2. The Fourier spectroscopic analyzer according to claim 1, wherein the light receiver comprises:
a first detector that is sensitive to the first wavelength band and the second wavelength band;
a second detector that is sensitive to the first wavelength band and the second wavelength band; and
a branch mirror that causes the transmitted light or the reflected light to branch into the first wavelength component and the second wavelength component, wherein the first wavelength component is incident on the first detector, and the second wavelength component is incident on the second detector.

3. The Fourier spectroscopic analyzer according to claim 2, wherein the branch mirror comprises a dichroic mirror that:
reflects the first wavelength component, and
transmits the second wavelength component.

4. The Fourier spectroscopic analyzer according to claim 2, wherein the branch mirror comprises a dichroic mirror that:
transmits the first wavelength component, and
reflects the second wavelength component.

5. The Fourier spectroscopic analyzer according to claim 2, wherein the branch mirror comprises:

a half mirror that causes the transmitted light or the reflected light to branch into first light directed toward the first detector and second light directed toward the second detector;

a first filter that:
extracts the first wavelength component from a wavelength component included in the first light, and
causes the extracted first wavelength component to be incident on the first detector; and a second filter that:
extracts the second wavelength component from a wavelength component included in the second light, and
causes the extracted second wavelength component to be incident on the second detector.

6. The Fourier spectroscopic analyzer according to claim 1, wherein the light receiver comprises:
a first detector that has a higher detection sensitivity for the first wavelength component than for the second wavelength component; and
a second detector that has a higher detection sensitivity for the second wavelength component than for the first wavelength component.

7. The Fourier spectroscopic analyzer according to claim 6, wherein the first detector is disposed before the second detector on an optical path of the transmitted light or the reflected light.

8. A Fourier spectroscopic analyzer comprising:
an interferometer that emits an interferogram to a sample, wherein the interferogram is interference light and the sample is an analysis target;
a light receiver that:
receives a first wavelength component of a first wavelength band and a second wavelength component of a second wavelength band among wavelength components included in transmitted light of the interferogram that has passed through the sample or in reflected light of the interferogram that has been reflected by the sample,
outputs a first light reception signal acquired by receiving the first wavelength component and a second light reception signal acquired by receiving the second wavelength component, wherein the first wavelength band is a wavelength band of which a spectrum is acquired, and the second wavelength band is different from the first wavelength band; and
a signal processing device that:
eliminates noise superimposed on the first wavelength component and on the first spectrum, wherein the noise is caused by changes in optical characteristics of the sample over time;
acquires the spectrum of the first wavelength component by Fourier transform processing using the first light reception signal and the second light reception signal;
applies the Fourier transform processing on the first light reception signal and the second light reception signal to respectively acquire a first spectrum and a second spectrum; and
eliminates the noise superimposed on the first spectrum by subtracting the second spectrum from the first spectrum.

* * * * *